UNITED STATES PATENT OFFICE.

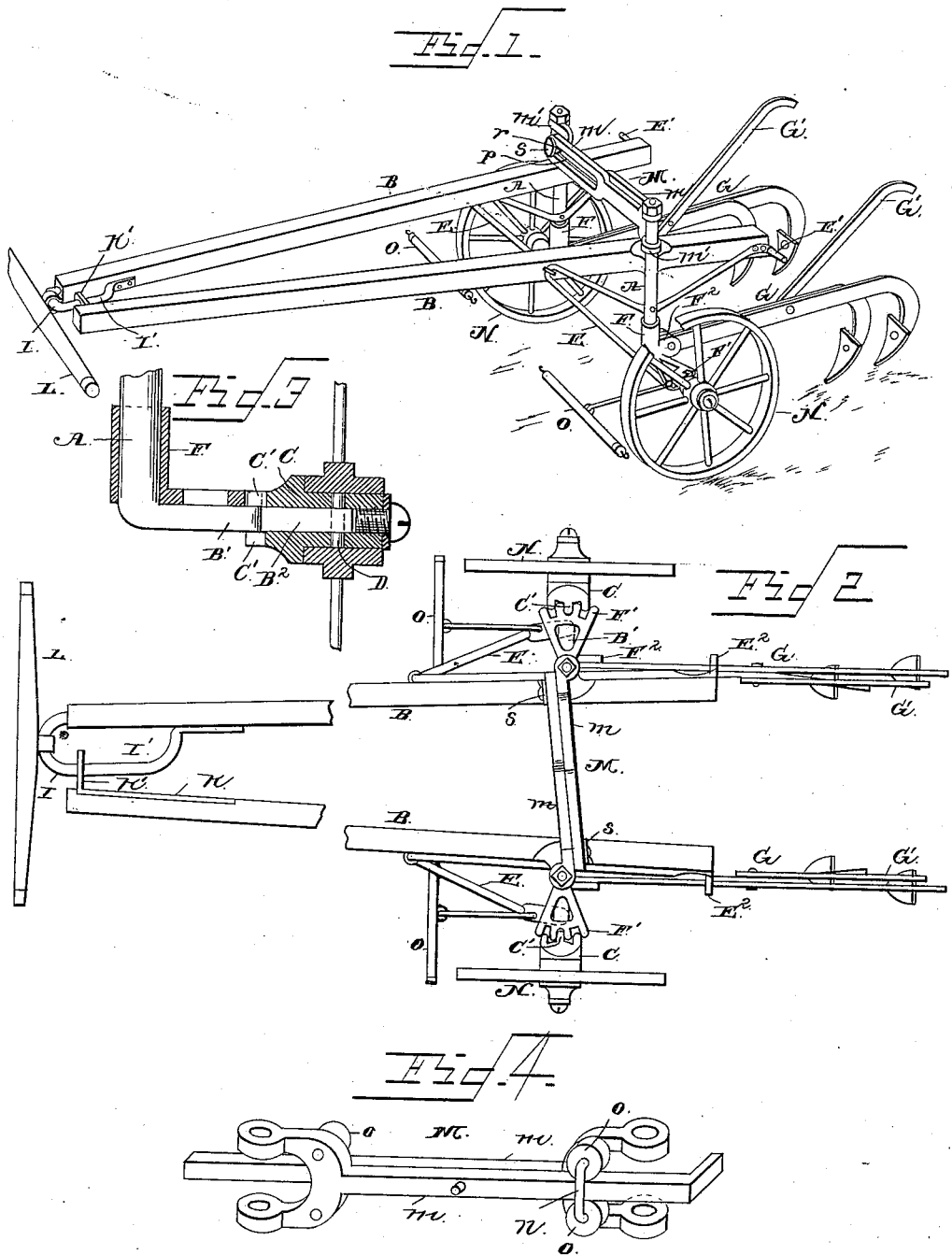

SAMUEL WILLIAM GUTRIDGE, OF JOHNSTOWN, MISSOURI.

SULKY-PLOW.

SPECIFICATION forming part of Letters Patent No. 334,117, dated January 12, 1886.

Application filed September 26, 1885. Serial No. 178,268. (No model.)

*To all whom it may concern:*

Be it known that I, SAMUEL WILLIAM GUTRIDGE, a citizen of the United States, residing at Johnstown, in the county of Bates and State of Missouri, have invented a new and useful Improvement in Sulky-Plows, of which the following is a specification, reference being had to the accompanying drawings.

My invention relates to an improvement in sulky-plows; and it consists in the peculiar construction and combination of devices, that will be more fully set forth hereinafter, and particularly pointed out in the claims.

In the drawings, Figure 1 is a perspective view of of a sulky-plow embodying my invention. Fig. 2 is a top plan view of the same, partly in section. Fig. 3 is a detailed view. Fig. 4 is a modification.

A represents vertical metallic standards, which are secured near their upper ends to draft-bars B, near the rear ends of the latter. The lower ends of the standards are bent horizontally, and extend outwardly, as at B'. The outer ends of the horizontal portions of the standards are reduced, as at $B^2$, and to these reduced portions are pivoted hollow cylindrical sleeves or skeins C, by means of pivots D, that pass vertically through the centers of the sleeves, and through the reduced ends $B^2$ in the bores of said sleeves. The inner ends of the pivoted sleeves have inwardly-extending segment-teeth C'.

E represents brace-rods that are secured near their rear ends to the rear ends of the draft-bars, and extend downwardly and forwardly to near the lower ends of the vertical portions of the standards, to which they are secured, and are bent upwardly and extend forwardly to the draft-bars, where they are secured, and are then bent and extended downwardly, rearwardly, and outwardly to near the outer ends of the horizontal portions of the standards, to which they are secured, as shown. At their rear ends the brace-rods are bent outwardly and slightly upwardly, forming hooks E', the function of which will be described later on. On the lower ends of the vertical portions of the standards are mounted pivotal sleeves or couplings F, having outwardly-extending horizontal arms provided with teeth F', that mesh with the teeth C' of the sleeves C, and rearwardly-extending bracket-arms $F^2$, between which are pivoted the front ends of the plow-beams G. The plows employed in connection with my improved sulky may be of any desired kind, but are here shown as double-shovel plows or cultivators. A handle, G', is attached to each plow-beam in the usual manner. To the front end of one of the draft-bars is attached a clevis, I, having a horizontal rearwardly-extending slide-bar, I', and to the other draft-bar is attached a plate, K, having a bent lug, K', in which is an opening through which the bar I' passes, thus securing the front ends of the draft-bars together, but allowing them longitudinal reciprocating play or motion. A neck-yoke, L, is attached to the clevis I, as shown.

M represents an extension-coupling consisting of the sliding sections m, adapted to be moved lengthwise, so as to expand or contract the coupling. To effect this the sections may have keepers n to secure them together, and friction-rollers o, bearing on opposite sides of the extended arms of the sections, as shown in Fig. 4. In Figs. 1 and 2 the sections are provided with long slots p in their ends, and have friction-rollers r working in said slots, and washers s bearing on opposite sides of the sections to secure them together, as shown. The outer ends of the sections of the extensible coupling have pivotal eyes m' bearing on the upper ends of the vertical standards. This coupling thus connects the rear ends of the draft-bars, allowing the latter to play longitudinally independently of each other, and also to be moved toward or from each other at their rear ends. Supporting-wheels N are mounted on the pivoted skeins C, the vertical axes of these wheels passing through the vertical centers of the pivotal bolts D. Single-trees O are attached to the horizontal portions of the standards, and to these single-trees the draft-animals are hitched, each animal being required to draw only the plow behind him. As the draft-bars are adapted to move back and forth independently of each other, no double-tree or draft-evener is required. When the machine is being drawn in a straight line, the plows are trailed directly behind, and being geared to the spindles or skeins on which the wheels are mounted, direct the latter in a straight line also, thus rendering the labor of guiding the machine to the plowman, who has hold on the handles, very light. Should the team deviate from a straight line, the plows may be moved laterally by means of the handles, which will turn the pivoted skeins or spindles and direct the wheels in the proper direction.

The plows may be raised from the ground, in order to avoid an obstruction, and suspended upon the hooks E' when turning at the end of a row, or when on the road.

Having thus described my invention, I claim—

1. The combination, in a sulky-plow, of the standards having the horizontal extensions, the skeins or spindles pivoted thereon and having the teeth C', the couplings pivoted on the standards and having the teeth meshing with teeth C', and the plows trailing therefrom, whereby the spindles or skeins may be turned by moving the rear ends of the plow-beams laterally, substantially as described.

2. The combination, in a sulky-plow, of the standards carrying the supporting-wheels and the trailing plows, and the couplings M, pivoted or hinged to the said standards, to permit independent longitudinal movement of the plows, substantially as described.

3. The combination, in a sulky-plow, of the standards carrying the supporting-wheels and the trailing plows, and the extensible couplings M, pivoted or hinged to the said standards, to permit independent longitudinal movement of the plows and lateral adjustment thereof, substantially as described.

In testimony that I claim the foregoing as my own I have hereto affixed my signature in presence of two witnesses.

SAMUEL WILLIAM GUTRIDGE.

Witnesses:
L. ELMLINGER,
SUE A. FLETCHER.